United States Patent [19]

Wilson

[11] Patent Number: 5,764,024
[45] Date of Patent: Jun. 9, 1998

[54] PULSE WIDTH MODULATOR (PWM) SYSTEM WITH LOW COST DEAD TIME DISTORTION CORRECTION

[75] Inventor: David L. Wilson, New Berlin, Wis.

[73] Assignee: Motorola, Inc., Schaumburg, Ill.

[21] Appl. No.: 835,370

[22] Filed: Apr. 7, 1997

[51] Int. Cl.$^6$ .................................. H02P 6/10; H02P 7/29
[52] U.S. Cl. .......................... 318/805; 318/811; 318/254
[58] Field of Search ........................ 318/138, 254, 318/504, 599, 600, 722, 798, 805, 806, 810, 811; 388/907.5, 928.1

[56] References Cited

U.S. PATENT DOCUMENTS

| | | | |
|---|---|---|---|
| 4,454,454 | 6/1984 | Valentine | 318/293 |
| 4,511,809 | 4/1985 | Allen | 307/254 |
| 4,719,555 | 1/1988 | Hattori et al. | |
| 4,745,991 | 5/1988 | Tanahashi | |
| 5,448,149 | 9/1995 | Ehsani et al. | |
| 5,450,306 | 9/1995 | Garces et al. | |

OTHER PUBLICATIONS

Motorola, "HC08 MC68HC708XL36 Technical Summary," HC708XL36TS/D Rev. 1, pp. 12–1–12/22 (1995).
Choi, Jong Woo, et al., Invertor Output Voltage Synthesis Using Novel Dead Time Compensation, Department of Electrical Engineering, Seoul National University; pp. 100–108 (1994).

*Primary Examiner*—Bentsu Ro
*Attorney, Agent, or Firm*—Craig J. Yudell; Paul J. Polansky

[57] ABSTRACT

A pulse width modulator (PWM) system (100) detects several load current conditions to completely correct for the distortion caused by deadtime insertion when driving an inverter-fed inductive load, such as a three-phase AC motor. The system includes an inexpensive voltage sensor (140) which senses the output voltage at the end of each successive dead time interval in which neither a pullup transistor (51) nor a pulldown transistor (52) is driving. The system (100) includes a programmable PWM (125), two storage elements (131,132) such as D-type flip flops, and a memory-mapped register (133). The register stores the output of the flip-flops to indicate a near-zero load current condition. When it detects this condition, the system (100) changes the duty cycle of the PWM output signals to yield output voltages and currents which more closely approximate a sine wave. The system (100) is particularly useful as part of a low-cost microcontroller (120).

37 Claims, 4 Drawing Sheets

PULSE WIDTH MODULATOR (PWM) SYSTEM WITH LOW COST DEAD TIME DISTORTION CORRECTION

FIELD OF THE INVENTION

This invention relates generally to electric circuits, and more particularly to digital circuits which drive inverter-fed inductive loads.

BACKGROUND OF THE INVENTION

The microelectronics revolution has enabled digital circuitry to be used in a variety of control applications. For example, microcontrollers (MCUs) have recently been used to control motors for such applications as heating, ventilation and air conditioning (HVAC), factory automation, variable speed drives, and the like. The MCU typically accomplishes the control function by including a peripheral circuit known as a pulse width modulator (PWM) which operates under control of the MCU. The PWM is able to control the speed and operation of the motor by modulating the pulse width of signals which drive power inverters.

An example of such a system is shown in FIG. 1, which illustrates in partial block diagram and partial schematic form an alternating current (AC) three-phase motor system. System 20 includes generally an MCU 21, an isolation circuit 22, a power module 23, and a three-phase AC inductive motor 24. MCU 21 includes a PWM 26 plus other elements of a conventional MCU including a central processing unit (CPU), program memory, and other peripheral circuits which are omitted from FIG. 1 for convenience. Since motor 24 is three-phase, PWM 26 provides signals for controlling a pullup and a pulldown transistor for each of the three phases. In addition, it is necessary to output a ground signal, and thus PWM 26 provides seven outputs. Isolation block 22 receives these seven outputs and provides six drive signals to corresponding transistors in power module 23. Isolation block 22 may be implemented using optocouplers, photo transistors, transformers, or like devices and prevents high voltages from appearing on the output lines of PWM 26, thereby protecting MCU 21 from circuit damage.

Power module 23 is a circuit which allows a three-phase AC input such as a conventional 230-volt or 460-volt three-phase AC line voltage. Power module 23 allows this signal to be changed such that motor 24 becomes a variable speed motor. Thus, system 20 is especially useful in systems requiring variable speed motors. For example, the frequency of motor 24 may be reduced during standby periods.

Power module 23 includes generally an input section 30, a capacitor 40, a resistor 41 and an output section 50. Input section 30 includes diodes 32–37. Each of diodes 32–34 has a negative terminal connected to a terminal labeled "P1" and a positive terminal connected to a respective one of three three-phase input terminals labeled "R", "S", and "T". Diodes 35–37 have negative terminals connected to the positive terminals of diodes 32–34, respectively, and positive terminals connected together and to a node labeled "N1". Capacitor 40 has a first terminal connected to the P1 terminal and a second terminal connected to the N1 terminal. Thus, input section 30 in conjunction with capacitor 40 form a converter which converts the three-phase AC input into a single constant voltage between terminals P1 and N1. Note, however, other converters such as those using transistors or diodes of various characteristics may be used in place of converter 30.

As shown in FIG. 1, power module 23 corresponds to a commercially available hybrid integrated circuit such as a high power module made by the High Power Products Division of Motorola, Inc. Thus, in FIG. 1 power module 23 includes terminals P2 and N2 which in system 20 are connected to terminals P1 and N1 respectively, but which may not be connected together in all applications. Resistor 41 has a first terminal connected to terminal N2, and a second terminal connected to inverter portion 50. Resistor 41 is useful in detecting a direct (DC) bus, which is useful for overcurrent detection, measurement of characteristics, and the like.

Inverter portion 50 includes three half-bridge sections each corresponding to a respective phase. Section 50 includes insulated gate bipolar transistors (IGBTs) 51–56, and rectifiers 61–66. Transistor 51 has a collector connected to terminal P2, a gate for receiving a signal labeled "G1", and an emitter for receiving a signal labeled "K1". Transistor 52 has an emitter connected to the collector of transistor 51, a gate for receiving a signal labeled "G2" and an emitter connected to the second terminal of resistor 41. Transistor 53 has a collector connected to terminal P2, a gate for receiving a signal labeled "G3", and an emitter for receiving a signal labeled "K3". Transistor 54 has a collector connected to the emitter of transistor 53, a gate for receiving a signal labeled "G4", and an emitter connected to the second terminal of resistor 41. Transistor 55 has a collector connected to terminal P2, a gate for receiving a signal labeled "G5", and an emitter for receiving a signal labeled "K5". Transistor 56 has a collector connected to the emitter of transistor 55, a gate for receiving a signal labeled "G6", and an emitter connected to the second terminal of resistor 41. The emitters of transistors 51, 53, and 55 are also connected to output terminals of power module 23 which are labeled "U", "V", and "W", respectively, which form each phase of the input of motor 24. Note that signals K1–K3 are common (ground) voltages provided by isolation block 22 when it forms the isolated signals from the output of PWM 26 and its common ground signal.

In addition to transistors 51–56, inverter portion 50 also includes rectifiers 61–66 which prevent harm caused during periods in which the inverter is driving neither high nor low, which are known as deadtime intervals. Each of rectifiers 61–66 have a negative terminal connected to the collector of a respective one of transistors 51–56, and a positive terminal connected to the emitters of respective transistors 51–56. Rectifiers 61–66 are referred to as commutation diodes because they provide appropriate current paths when motor 24 develops voltages on signals U, V, and W during the deadtime intervals.

In operation, PWM 26 under the control of MCU 21 provides output signals whose duty cycle at particular points in time is proportional to the magnitude of the voltage applied to motor 24. When changing between the pullup transistor and the pulldown transistor being conductive, there is a short period of time during which neither transistor is conductive. This period, known as the deadtime interval, is necessary to avoid the pullup and pulldown transistors both being conductive at the same time, which would cause undesirable shoot-through currents. In general during the deadtime interval, motor 24 drives the U, V, or W signal lines and rectifiers 61–66 provide current conduction paths.

The deadtime interval causes the magnitude of the current to be reduced in absolute terms throughout the cycle, resulting in significant waveform distortion. One known technique for correcting for this magnitude error uses an offset in the PWM output signal as a function of output current polarity to compensate for the loss in amplitude due to the deadtime interval. During periods of positive current, the pullup transistor "on time" is increased, and the pulldown transistor "on time" is decreased. During periods of negative current, the pulldown transistor "on time" is increased, and the pullup transistor "on time" is decreased. This PWM offset technique is effective during most of the period of the waveform. However, it is inadequate to compensate for the deadtime distortion when the output current is near zero.

During a deadtime interval when the current on a particular phase is near zero, the voltage at the U, V, or W terminal is determined by the relative sizes of the inductance of motor 24 and other parasitics in the system, rather than by the current polarity. This indeterminate voltage characteristic during the near-zero deadtime interval makes it impossible using only current polarity information to adequately prevent distortion in the motor signal. This phenomenon will hereinafter be referred to as near-zero distortion. Such near-zero distortion causes nonlinear periods of torque, undesirable electrical signal transients, and noisy operation.

An example of such distortion is shown in FIG. 2, which illustrates a timing diagram of a waveform representing the current flowing into motor 24 on a single phase thereof. In FIG. 2 the horizontal axis represents time and the vertical axis current. The origin is designated "t0" and additional time points of interest are designated "t1–t7". At time point t1, the current through the monitored phase of motor 24 is at a maximum. Ideally, the waveform is a perfect sinusoid. But between time periods t2 and t3, when the output current is near zero, a distortion or flattening out of the motor current signal is encountered. A similar distortion occurs between time points t5 and t6 following a minimum point in the waveform at time point t4 and prior to a maximum of the wave form at time point t7.

One known technique for correcting such near-zero distortion in the motor current may be provided through a current sensing technique. Such a technique is disclosed by Choi, et al. in an article entitled "Inverter Output Voltage Synthesis Using Novel Deadtime Compensation", in the Conference Proceedings of the Ninth Annual Applied Electronics Conference and Exposition, Feb. 13–14, 1994. However, there is a serious drawback to the approach used by Choi, et al., namely the compensation provided by Choi, et al. is done by use of closed loop system. Such a system adds significant expense and is impractical in many applications.

Another known technique senses the current into motor 24 directly and compensates for the signal distortion using analog techniques. However, this solution to the problem is also expensive due to the use of current sensors, and this technique is inadequate for many low-cost motor applications. Thus, what is needed is a circuit that compensates for near-zero distortion and which may be implemented cheaply and in an open loop system. Such a circuit and microcontroller for use with such a circuit are provided by the present invention, whose features and advantages will become clearer with reference to the following detailed description in conjunction with the accompanying drawings.

DETAILED DESCRIPTION OF A PREFERRED EMBODIMENT

Figure 1:
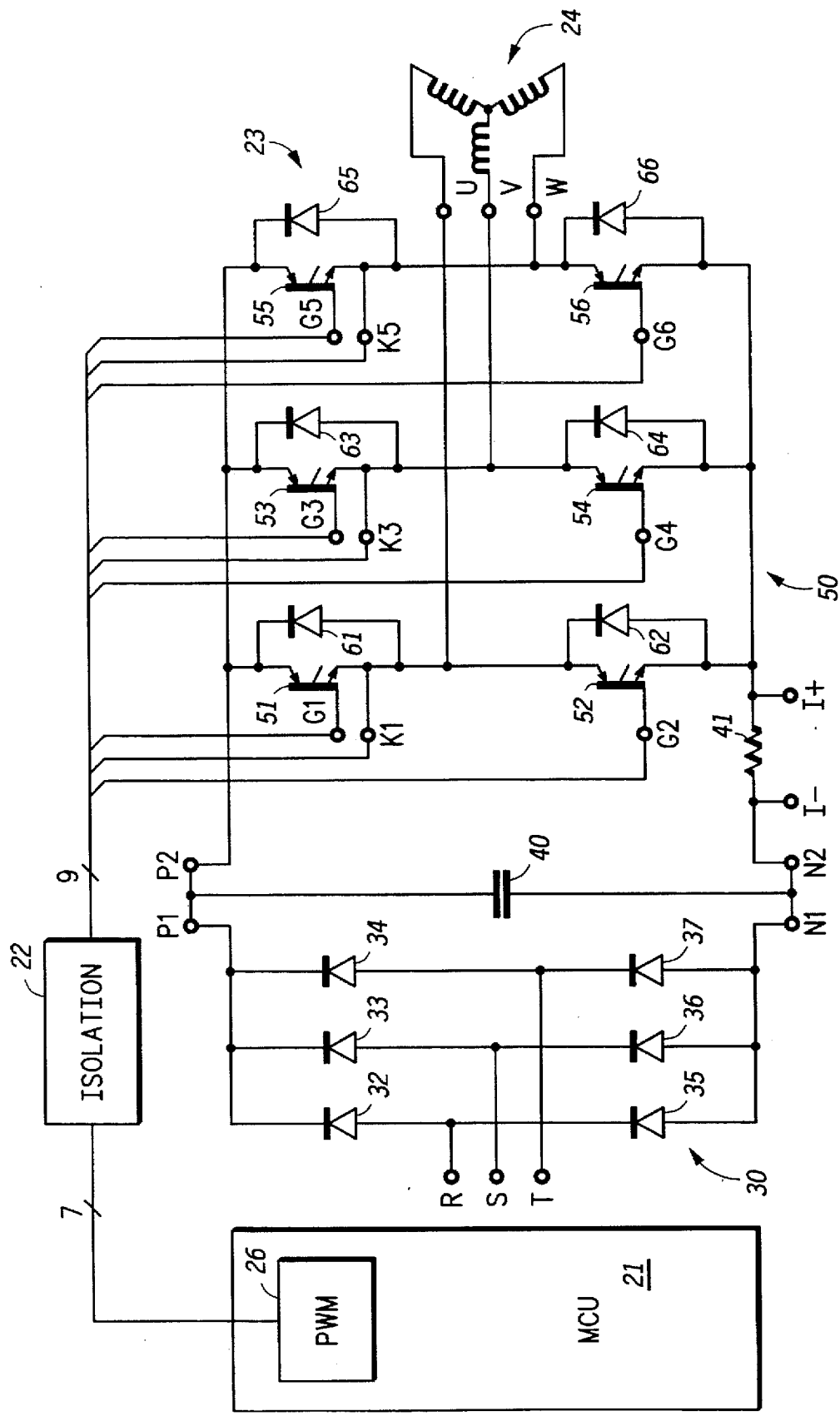
FIG. 1 illustrates in partial block diagram and partial schematic form a motor system according to the prior art.
Figure 3:
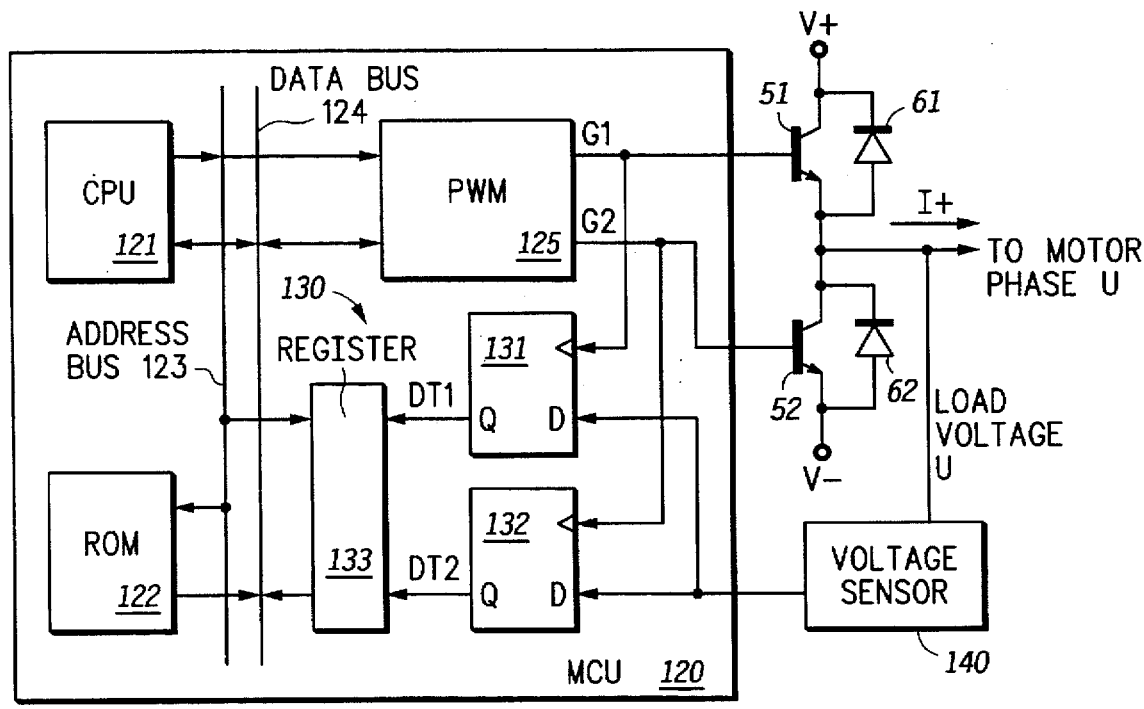
FIG. 3 illustrates in partial block diagram, partial logic diagram, and partial schematic form a portion of a motor system according to the present invention.

FIG. 3 illustrates in partial block diagram, partial logic diagram, and partial schematic form a pulse width modulator (PWM) system 100 according to the present invention. Note that PWM system 100 does not include all of the elements of the motor system such as the motor itself, and these elements are omitted for better understanding of the present invention. PWM system 100 includes generally an MCU 120 and a voltage sensor 140. Also illustrated in FIG. 3 are transistors 51 and 52 and diodes 61 and 62 which have the same reference numbers as corresponding elements in FIG. 1. As their connection and operation are described in detail in FIG. 1, transistors 51 and 52 and diodes 61 and 62 are connected to motor phase U and will not be described further. Note that for the purposes of this discussion a current labeled "I+" in FIG. 3 establishes the convention that a positive current into motor phase U terminal will be represented by a positive value. Furthermore, the voltage on terminal U is labeled "LOAD VOLTAGE U". Also note that while the drawings and description are of a PWM system for generating a single-phase, the present invention is applicable to systems for generating multiple phases such as the three-phase system of FIG. 1, as will be appreciated by those skilled in the art.

MCU 120 includes generally a CPU 121, a read only memory (ROM) 122, an address bus 123, a data bus 124, a PWM 125, and a low current condition circuit 130. CPU 121 has an output connected to address bus 123 and a bidirectional connection to data bus 124. CPU 121 may be implemented using any known microprocessor architecture such as complex instructions set computer (CISC), reduced instruction set computer (RISC), digital signal processor (DSP), and the like. Note however that low current condition circuit 130 is most advantageously implemented when CPU 121 is either a microcontroller core or a digital signal processor. A microcontroller core would be more useful for lower cost applications whereas a digital signal processor would be preferred for higher performance applications.

ROM 122 has an input connected to address bus 123, and an output connected to data bus 124. ROM 122 may be used for such functions as program storage, coefficient storage, and the like. For example, ROM 122 may store coefficients which define a sine wave which would be useful when CPU 121 operates PWM 125.

PWM 125 includes an input terminal connected to address bus 123, a bidirectional connection to data bus 124, a first output terminal for providing signal G1, and a second output terminal for providing signal G2. PWM 125 may operate similarly to any conventional PWM except as will be detailed below. Low current condition circuit 130 includes a first clocked D-type flip-flop 131, a second clocked D-type flip-flop 132, and a register 133. Flip-flop 131 has a D input, a clock input for receiving signal G1, and a Q output terminal providing a signal labeled "DT1". Flip-flop 132 has a D input terminal, clock input terminal for receiving signal G2, and a Q output terminal for providing signal DT2 to register 133. Signals G1 and G2 are also provided to the gates of transistors 51 and 52, respectively. Voltage sensor 140 has an input terminal for receiving LOAD VOLTAGE U, and an output terminal connected to the D input terminals of flip-flops 131 and 132.

PWM system 100 provides a voltage to motor phase U such that the current conducted by motor phase U is more closely sinusoidal. Voltage sensor 140 receives LOAD VOLTAGE U, and provides a digital output when LOAD VOLTAGE U has reached a predetermined threshold within a predetermined time related to the deadtime interval. Note that signals G1 and G2 are nonoverlapping with respect to each other, and the amount by which signals G1 and G2 are nonoverlapping define the deadtime interval. Thus, flip-flops 131 and 132 are continuously clocked in succession at an overall rate defined by the basic period of PWM 125.

Register 133 is a memory mapped register having input terminals for receiving signals DT1 and DT2, an input terminal connected to address bus 123, and an output terminal connected to data bus 124. Software executing on CPU 121 which controls PWM 125 may examine the contents of register 133 and take appropriate corrective action as will be described below.

The deadtime interval is necessary to prevent shoot-through currents in transistors 51 and 52, and is well known in the art. However, the deadtime interval caused by the nonoverlapping nature of signals G1 and G2 causes distortion in the current signal into motor phase U. This distortion shows up in two ways. First, the magnitude of the current signal is reduced. Second, when the current signal approaches a zero level or a zero crossing the sine wave curve essentially flattens out, known as near-zero distortion.

The first type of distortion may be corrected easily using known techniques within MCU 120. This is because when the current signal is large and positive, the distortion is constant at a negative level. Thus, MCU 120 is able to compensate for this distortion by properly changing the duty cycle output by PWM 125 during the periods of time in which the current magnitude is positive. Likewise, during periods of time in which the current is large and negative, the distortion causes a decrease in the absolute value of the negative voltage. MCU 120 may also compensate for this distortion by properly changing the signals provided by PWM 125 to increase this negative voltage.

The distortion caused at the zero crossing is more difficult to correct. According to the present invention the point at which the current waveform approaches zero level may be detected to enable correction before the sinusoidal waveform flattens out by immediately switching from a positive to a negative or a negative to a positive correction factor. As illustrated in FIG. 3 this could be represented by sensing when current in phase U approaches zero crossing and at that point in time changing the duty cycles of signals G1 and G2 with correction offsets required to compensate for distortion after crossing zero. Note that the near-zero distortion correction is achieved by the addition of two D-type flip-flops, one register which is connected to the internal buses of MCU 120, and an inexpensive voltage sensor. Thus, such a distortion compensation circuit is now feasible for many lower cost motor applications.

For example, MCU 120 is preferably implemented as a modification of the MC68 HC08MP16 which is currently available from Motorola, Inc. of Austin, Tex. But, the circuitry according to the present invention is also very useful in MCUs in which CPU 121 is a digital signal processor (DSP), which is more likely to be used for higher performance motors.

Note that voltage sensor 140 may be implemented by a variety of voltage sensing circuits. For example, voltage sensor 140 may be implemented as an analog-to-digital converter (ADC) in which case the exact profile of LOAD VOLTAGE U may be constructed. A second circuit which may be used for voltage sensor 140 is a hysteresis device such as a conventional Schmitt trigger or a comparator which has hysteresis. A third type of device which may implement voltage sensor 140 is a comparator whose threshold voltage may be switched between two levels. The advantage of the two separate threshold voltages will be better understood in conjunction with the description of FIGS. 5 and 6 below. Voltage sensor 140 may also be implemented using a resistor/capacitor (RC) network at the input of a conventional comparator. Such a delay element provides the equivalent of hysteresis or the changing of the threshold. Another type of circuit which may be used as voltage sensor 140 is a transition detector such as those that are used in address transition detection (ATD) circuits which are common in many memory integrated circuits. In addition, other circuits may be used for voltage sensor 140. The primary characteristic of voltage sensor 140 is that it senses when a voltage passes a threshold and provides a digital output signal in response.

Flip-flops 131 and 132 use signals GI and G2 as clocking signals so that the output of flip-flops 131 and 132 (signals DT1 and may represent various motor current conditions. For example, when current into motor phase U is a large positive current, designated as I+, voltage sensor 140 during the deadtime interval provides a voltage at the output thereof at a logic low level. Except during periods in which the current into motor phase U has low amplitude, the outputs of flip-flops 131 and 132 will be the same. CPU 121 under the control of software which may be stored in ROM 122 may then advantageously use this information to provide the adequate compensation to signals G1 and G2. Likewise, when the current into motor phase U is a negative value and a relatively high amplitude, voltage sensor 140 outputs a logic high level. The outputs of flip-flops 131 and 132 are equal to "11". However, during periods of transition the successive values sensed by voltage sensor 140 will change, and thus, DT1 and DT2 will be "01". Thus, the 01 condition signals a pending transition in the polarity of the current to motor phase U.

When these values are encountered, the software running on CPU 121 is able to change the correction offset of the duty cycle of the appropriate one (or both) of signals of G1 and G2 in anticipation of the current zero-crossing. Thus, instead of a flattening out of the current curve, it makes a transition in the vertical direction which results in insignificant distortion at the zero crossing. The values that signals DT1 and DT2 may assume are reproduced in Table 1 below:

TABLE I

| DT1 | DT2 | Condition |
|---|---|---|
| 0 | 0 | high positive current |
| 1 | 1 | high negative current |
| 0 | 1 | low current |
| 1 | 0 | invalid combination |

Figure 4:
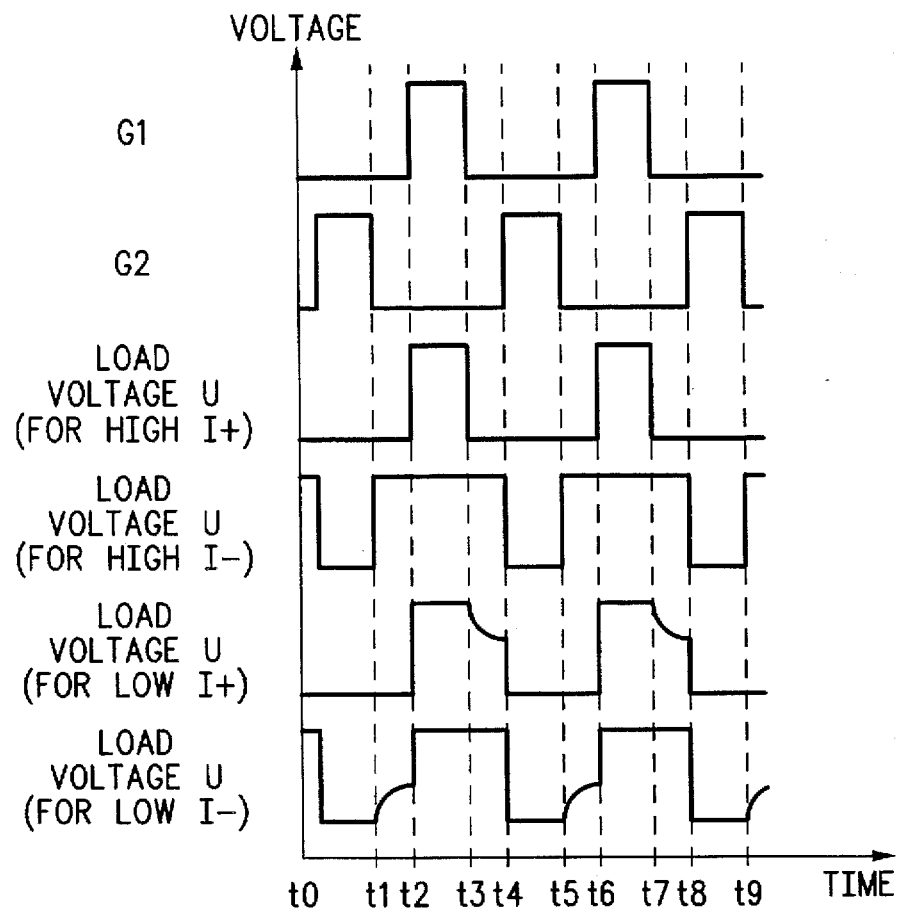
FIG. 4 illustrates a timing diagram of signals useful in understanding the operation of FIG. 3.

FIG. 4 illustrates a timing diagram of various voltages relevant to understanding the operation of the present invention including signals G1, G2, and LOAD VOLTAGE U. LOAD VOLTAGE U is shown for four different conditions: one for high positive current, one for high negative current, one for low positive current, and one for low negative current. In FIG. 4 the horizontal axis represents time and the vertical axis represents voltage. Also, note in FIG. 4 various relative times may not necessarily be drawn to scale, and thus, the deadtime intervals may appear relatively longer than in typical embodiments. In FIG. 4 various time points of interest are illustrated as times t0–t9. t0 represents the origin and each of the other time periods represent deadtime intervals during which neither G1 nor G2 are active. Thus, as shown in FIG. 4 a first deadtime interval occurs between time periods t1 and t2, a second deadtime interval occurs between time periods t3 and t4, a third deadtime interval occurs between times t5 and t6, and a fourth deadtime interval occurs between times t7 and t8. t9 designates the start of another deadtime interval at the end of the period of interest.

For a high positive load current, the inductance of motor 24 quickly drives LOAD VOLTAGE U to a low voltage during the deadtime interval. Likewise for a high negative load current, the inductance of motor 24 quickly drives LOAD VOLTAGE U to a high voltage during the deadtime interval. However for a low positive load current during intervals t3–t4 and t7–t8, the inductance of motor 24 has difficulty reducing the voltage of LOAD VOLTAGE U due to the interaction with parasitic inductance and capacitance of the system. Thus the high voltage on LOAD VOLTAGE U decays only slowly during the deadtime interval. Likewise for a low negative load current during intervals t1–t2 and t5–t6, the inductance of motor 24 has difficulty increasing the voltage of LOAD VOLTAGE U due to the interaction with the system parasitics. Thus the slow decays during low current conditions represent a voltage distortion which causes a flattening of the current curve illustrated in FIG. 2.

Figure 5:
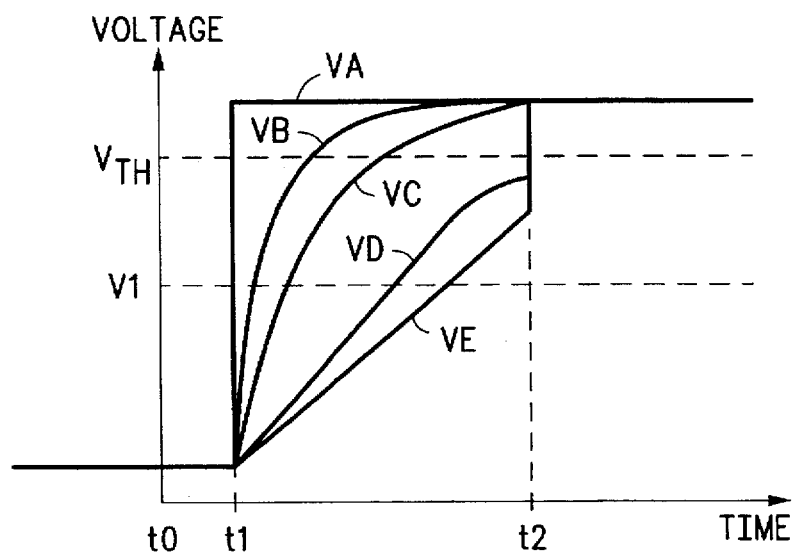
FIG. 5 illustrates in timing diagram form another set of voltage waveforms useful in understanding the operation of FIG. 3.

FIG. 5 illustrates a timing diagram of various voltages useful in understanding the present invention. In FIG. 5 the horizontal axis represents time and the vertical axis represents LOAD VOLTAGE U. Two time points of interest are time points t1 and t2, and as in prior figures, time t0 represents the origin of the time axis. Along the vertical axis two voltages of interest, including a first voltage labeled "V1", and a second voltage labeled "$V_{TH}$".

An ideal characteristic of the sense voltage is illustrated by waveform VA. At time t1, VA switches completely from a steady state low level to a steady state high level, and thus, the voltage switches cleanly during the deadtime interval between time periods t1 and t2. Since $V_A$ represents an ideal characteristic, it cannot be achieved in practical circuits. However, a waveform labeled "$V_B$" represents a possible waveform. Since an inductance opposes an instantaneous change in current and since a motor may be modeled electrically as a large inductance, a waveform such as the $V_B$ waveform may represent the best achievable switching characteristic under high current conditions. Waveforms C, D, and E represent other waveforms which are very likely to be encountered at varying current amplitude conditions.

According to the present invention, voltage sensor 140 detects when the LOAD VOLTAGE U has crossed a predetermined level. As illustrated in FIG. 4, voltage $V_1$ is at about one-half of the magnitude of the switching range. Preferably the threshold voltage to determine low current conditions is set at some level which is higher than $V_1$, namely $V_{TH}$ in FIG. 5. Thus, in FIG. 5 when waveforms $V_A$, $V_B$ and $V_B$ are encountered, the correction factor is unchanged; whereas, when waveforms $V_D$ and $V_E$ are encountered new correction values are employed. MCU 120 performs this correction by immediately changing the pulse widths of signals G1 and G2. For example, in FIG. 5 the voltage waveform is detected as "decreasing", MCU 120 immediately increases the pulse width to transistor 51 to drive LOAD VOLTAGE U to a higher voltage.

Note that in a typical embodiment, LOAD VOLTAGE U resembles $V_A$ during most of its cycle. However as the current approaches zero, the parasitics in the system begin to dominate. Thus LOAD VOLTAGE U may progress from waveform VA to VB, VC, and finally VD, at which point MCU 120 detects the "01" condition in register 133 and changes the correction value applied to and the pulse width duty cycle. This discrete switching results in the load current making an abrupt transition vertically instead of flattening out. This discrete switching removes virtually all of the distortion created by deadtime insertion.

Figure 2:
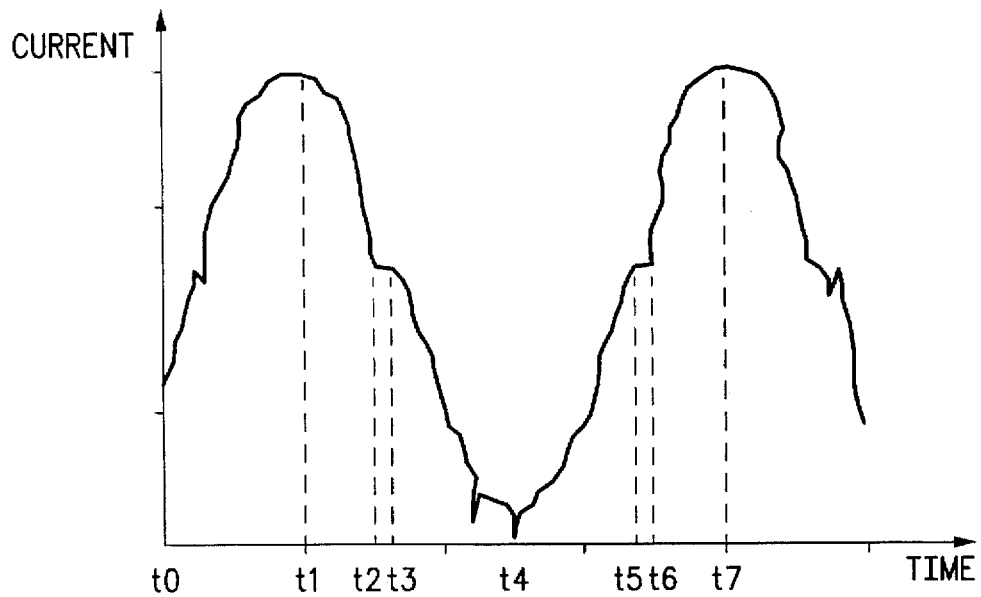
FIG. 2 illustrates in timing diagram form a signal associated with the motor system of FIG. 1.
Figure 6:
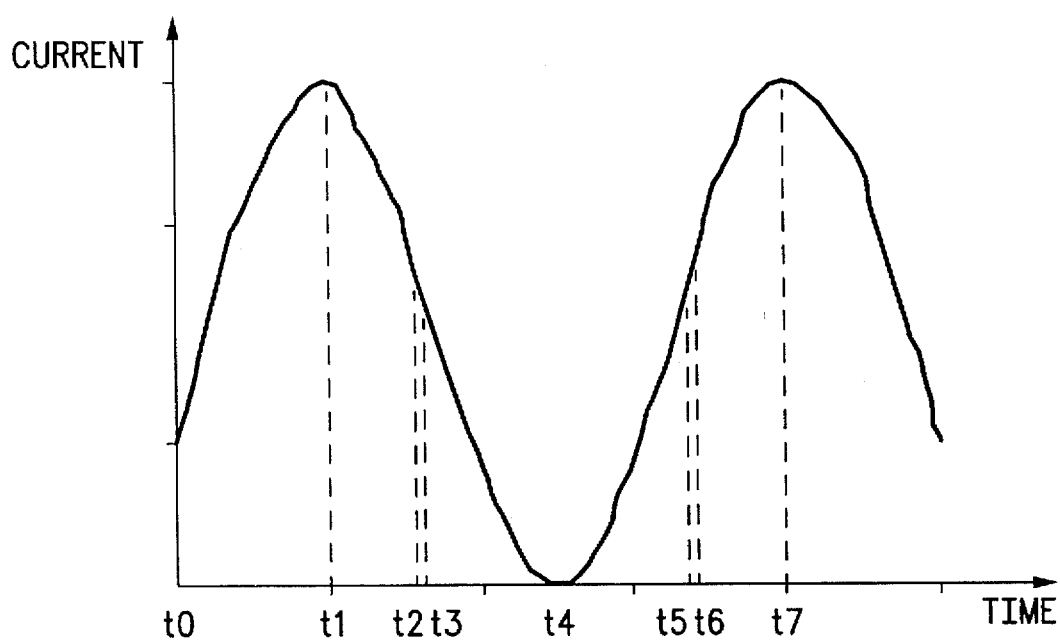
FIG. 6 illustrates a motor waveform corresponding to FIG. 2 but showing the output of one phase of the motor system of FIG. 3.

This improvement is further described with reference to FIG. 6, which illustrates the resulting current waveform in which time points t0–t7 correspond to similarly labeled time points in FIG. 2. Note that for an uncorrected current waveform as shown in FIG. 2, the sinusoidal character of the waveform is distorted between times t2 and t3, and t5 and t6. The combination of these distortions result in a discerning and unwanted torque pulsation which can be felt on the shaft of the motor. However according to the present invention the waveforms are now more sinusoidal and the portion of the waveform which previously was flattened now shows a slight vertical discontinuity. This discontinuity is acceptable, and cannot be felt on the motor shaft.

Thus the present invention provides a system for compensating for the distortion in the motor current signal of FIG. 2. This system is inexpensive and may be implemented using a modification to an existing microcontroller using only two D-type flip-flops, one register, and an external voltage sensor. Note that optionally an input to voltage sensor 140 may be scaled using a resistive divider. But even if the resistive divider is used, it does not add to system costs as much as a current sensor.

Note that in the illustrated embodiment the output provided by register 133 is examined by software executing on MCU 120 to determine whether OUTPUT VOLTAGE U has crossed $V_{TH}$ at time point t2. Typically, ROM 122 includes a coefficient table which represents a sine wave. In order to perform the compensation, the software program must read the contents of register 133. If the contents are 01, the software changes the value added to the sine wave data (fetched from the table) and alters appropriate control registers of PWM 125 to output signals G1 and G2 with a duty cycle corresponding to the sine wave data plus the new offset. This corrective action will result in a discontinuous jump in the duty cycle of the pulse width modulator output. However, the net motor voltage waveform will be smoother because this discontinuity counteracts changes in the voltage waveform which are occurring during the deadtime interval.

Note that this function can be performed by a microcontroller with the addition of only a single device pin per phase. Preferably MCU 120 includes at least six PWM outputs so that MCU 120 is capable of driving a three-phase inductive load such as a three-phase motor. Thus, this technique may be achieved by the addition of only three additional pins.

Note also that in the illustrated embodiment, voltage sensor 140 is external to MCU 120. However, in other embodiments, part or all of voltage sensor 140 may be included on-chip, depending upon how voltage sensor 140 is implemented. Note however, that since MCU 120 is implemented using a conventional low power complementary metal oxide semiconductor (CMOS) MCU, more functions may be implemented on chip by including a sensor such as a comparator. In this case, however, an external divider network to reduce the maximum magnitude of LOAD VOLAGE U is preferably used. In addition, note that an existing A-D converter channel of MCU 120 may be used to reconstruct portions of the waveform more directly. In addition, note that as future processing technologies such as bipolar-CMOS (BICMOS) become available, the inverter including IGBTs 51 and 52 and diodes 61 and 62 may also come to be implemented on chip with other elements of MCU 120.

While the invention has been described in the context of a preferred embodiment, it will be apparent to those skilled in the art that the present invention may be modified in numerous ways and may assume many embodiments other than that specifically set out and described above. For example, the present invention may be implemented using all hardware elements or with some combination of hardware and software. The system is useful for all types of inverter-fed inductive loads, including single-phase and multiple-phase AC motors. Furthermore while the system is suited for a low-cost microcontroller or a high-performance DSP, it may be used with other types of CPUs. Also the type of transistor technology may be IGBT, power MOS field-effect transistor (MOSFET), junction FET (JFET), gallium arsenide, or other suitable transistor types. Accordingly, it is intended by the appended claims to cover all modifications of the invention which fall within the true scope of the invention.

What is claimed is:

1. A system for driving an inductive load powered by a pair of transistors controlled by a first pulse-width-modulated (PWM) signal and a second PWM signal, wherein a dead-time occurs between the first PWM signal and the second PWM signal during which neither PWM signal is asserted, comprising:

a voltage sensor connected to the inductive load, the voltage sensor sensing a load voltage of the inductive load and producing a first value of an output signal when the load voltage is in a predetermined relation to a first predetermined value;

a microcontroller detecting the output signal from the voltage sensor, the first PWM signal and second PWM signal, the microcontroller generating a first signal indicating the value of the output signal at a first time during the dead-time, and generating a second signal indicating the value of the output signal at a second time during the dead-time;

wherein, when the first signal and the second signal indicate a different value, output current of the inductive load is within a predetermined magnitude of zero.

2. The system of claim 1, wherein the predetermined relation is that the load voltage is greater than the first predetermined value and current in the inductive load is of a first polarity.

3. The system of claim 1, wherein the first time occurs at an edge of the first PWM signal.

4. The system of claim 1, wherein the voltage sensor further produces the first value of the output signal when the load voltage is in a predetermined relation to a second predetermined value.

5. The system of claim 1, wherein the system is formed as an integrated circuit.

6. The system of claim 1, wherein the voltage sensor is a hysteresis device.

7. A near-zero current detection circuit for distortion correction of an inductive load powered by a pair of transistors controlled by a first modulated signal and a second modulated signal, wherein a dead-time occurs between the first modulated signal and the second modulated signal during which neither modulated signal is asserted, comprising:

a voltage sensor connected to the inductive load, the voltage sensor sensing a load voltage of the inductive load and producing a first value of an output signal when the load voltage is in a predetermined relation to a first predetermined value;

a first latch receiving the output signal from the voltage sensor at an input to the first latch, the first latch being controlled by the first modulated signal; and a second latch receiving the output signal from the voltage sensor at an input to the second latch, the second latch being controlled by the second modulated signal;

wherein a different value for the latched output signal of the first latch and the latched output signal of the second latch indicates that output current of the inductive load is within a predetermined magnitude of zero.

8. The circuit of claim 7, wherein the predetermined relation is that the load voltage is greater than the first predetermined value and current in the inductive load is of a first polarity.

9. The circuit of claim 7, wherein the voltage sensor further produces the first value of the output signal when the load voltage is in a predetermined relation to a second predetermined value.

10. The circuit of claim 7, wherein the first latch is controlled by the first modulated signal such that the output signal is latched by an edge of the first modulated signal 11. The circuit of claim 7, wherein the circuit is formed as an integrated circuit.

12. The circuit of claim 7, wherein the voltage sensor is a hysteresis device.

13. The circuit of claim 7, further comprising a pulse-width modulator that receives the output signal latched by the first latch and the output signal latched by the second latch and generates the first modulated signal and the second modulated signal, the pulse-width modulator being adapted to correct for distortion in the output current of the inductive load induced by commutation of the output current during dead-time by modifying a duty-cycle of one of the first and second modulated signals and, upon the occurance of a different value being output from the first latch than is output from the second latch, modifying a duty-cycle of the other of the first and second modulated signals, the other of the first and second modulated signals being modified prior to the output current being equal to zero to correct for near-zero distortion.

14. A data processing system for driving an inductive load powered by a pair of transistors controlled by a first pulse-width-modulated (PWM) signal and a second PWM signal, comprising:

a voltage sensor connected to the inductive load, the voltage sensor sensing a load voltage of the inductive load and producing a first value of an output signal when the load voltage is in a first state relative to a predetermined value;

a first latch receiving the output signal from the voltage sensor at an input to the first latch, the first latch being controlled by the first PWM signal such that the output signal is latched by an edge of the first PWM signal and output as a first latched output signal;

a second latch receiving the output signal from the voltage sensor at an input to the second latch, the second latch being controlled by the second PWM signal such that the output signal is latched by an edge of the second PWM signal and output as a second latched output signal;

a processor that receives the first latched output signal and the second latched output signal and generates the first PWM signal and the second PWM signal, wherein a dead-time is placed between the first PWM signal and the second PWM signal during which neither PWM signal is asserted, and wherein the processor modifies a duty-cycle of one of the first and second PWM signals and, upon the occurance of the first latched output signal being different than the second latched output signal, the processor modifies a duty-cycle of the other of the first and second PWM signals to correct for distortion in the output current of the inductive load induced by commutation of the output current during dead-time, the other of the first and second PWM signals being modified prior to the output current being equal to zero to correct for near-zero distortion of the output current.

15. A microcontroller for current distortion correction of an inductive load powered by a pair of transistors controlled by a first modulated signal and a second modulated signal, wherein a deadtime occurs between the first modulated signal and the second modulated signal during which neither modulated signal is asserted, comprising:

a device that senses a load voltage of the inductive load;

a latching device that stores a first value indicating the level of the load voltage during a first dead-time and stores a second value indicating the level of the load voltage during a second deadtime; and a controller that receives the stored values in the latching device and generates signals for correcting current distortion in response to the first value and the second value indicating selected levels.

16. The microcontroller of claim 15, wherein the first and second modulated signals are pulse-width-modulated signals.

17. The microcontroller of claim 15, wherein the latching device is a hysteresis device.

18. The microcontroller of claim 15, wherein the microcontroller is formed as an integrated circuit.

19. The microcontroller of claim 15, further comprising a modulator that generates the first modulated signal and the second modulated signal and modifies the first and second modulated signals in response to the signals generated by the controller, the first modulated signal being modified prior to output current of the inductive load being equal to zero to correct for near-zero distortion.

20. A method of near-zero current detection for distortion correction of an inductive load powered by a pair of transistors controlled by a first pulse-width-modulated (PWM) signal and a second PWM signal, wherein a dead-time period occurs after each pulse of the first PWM signal during which neither the first nor the second PWM signals are asserted, the method comprising the steps of:

sensing a first load voltage of the inductive load during a first dead-time period;

sensing a second load voltage of the inductive load during a second dead-time period; and generating signals for correcting near-zero current distortion in response to the first value and the second value indicating selected levels.

21. The method according to claim 20, wherein the selected levels are when the first load voltage is different than the second load voltage, indicating that output current of the inductive load is within a predetermined magnitude of zero.

22. The method according to claim 20, wherein the selected levels are when the first load voltage is greater than a predetermined value and current in the inductive load is of a first polarity.

23. The method according to claim 20, further comprising the step of generating the first PWM signal and the second PWM signal.

24. The method according to claim 20, further comprising the step of modifying the first and second PWM signals in response to the generated signals, the first PWM signal being modified prior to output current of the inductive load being equal to zero to correct for near-zero distortion.

25. A data processing system comprising:

a central processing unit having an output terminal connected to an address bus, and a bidirectional connection to a data bus;

a memory having an input terminal coupled to said address bus, and an output terminal coupled to said data bus, said memory including a plurality of storage locations which store a corresponding plurality of instructions which control the data processing system;

a pulse width modulator having a first input terminal coupled to said address bus, a second input terminal coupled to said data bus, and an output terminal for providing at least first and second control signals;

said first and second control signals adapted to be coupled to an inverter which drives an input of a motor; and a low current condition circuit having an input terminal adapted to receive a voltage signal which indicates a voltage at the input of the motor, and having an address input terminal coupled to said address bus, and a data output terminal coupled to said data bus for providing a low current condition signal in response to said voltage signal.

26. The data processing system of claim 25 wherein said voltage signal comprises a logic signal which indicates whether said voltage at the input of the motor is within a predetermined range of a zero level.

27. The data processing system of claim 26 wherein said low current condition circuit provides said low current condition signal when said logic signal is in a first logic state at a first predetermined point in time and said logic signal is in a second logic state at a second predetermined point in time.

28. The data processing system of claim 27 wherein said first predetermined point in time is an end of a dead time interval during a first cycle of said pulse width modulator, and said second predetermined point in time is an end of said dead time interval during a second cycle immediately subsequent to said first cycle.

29. The data processing system of claim 25 further comprising a voltage sensor having an input terminal adapted to be coupled to the motor, and an output terminal for providing said voltage signal.

30. The data processing system of claim 29 wherein said central processing unit, said memory, said pulse width modulator, said low current condition circuit, and said voltage sensor are all implemented on a single integrated circuit.

31. The data processing system of claim 29 wherein said voltage signal is provided by a circuit element comprising one of a group consisting of a voltage sensor, an analog-to-digital converter (ADC), a Schmitt trigger, a comparator which has hysteresis, a comparator having at least two switchable threshold voltages, and a transition detector circuit.

32. The data processing system of claim 25 wherein said central processing unit, said memory, said pulse width modulator, and said low current condition circuit are all implemented on a single integrated circuit.

33. The data processing system of claim 25 wherein said low current condition circuit comprises:
   a first flip-flop having a data input terminal for receiving said voltage signal, a clock input terminal for receiving a first clock signal, and an output terminal;
   a second flip-flop having a data input terminal for receiving said voltage signal, a clock input terminal for receiving a second clock signal, and an output terminal; and
   a register having a first input terminal coupled to said output terminal of said first flip-flop, a second input terminal coupled to said output terminal of said second flip-flop, an address input terminal coupled to said address bus, and an output terminal coupled to said data bus.

34. The data processing system of claim 33 wherein said first clock signal is said first control signal of said pulse width modulator, and wherein said second clock signal is said second control signal of said pulse width modulator.

35. The data processing system of claim 25 wherein said low current condition circuit detects a low current condition by providing a predetermined output signal to said data output terminal thereof.

36. The data processing system of claim 35 wherein said central processing unit periodically reads a value at said data output terminal of said low current condition circuit and in response to said predetermined output signal, said central processing unit programs said pulse width modulator to change an operating characteristic thereof.

37. The data processing system of claim 36 wherein said operating characteristic comprises a duty cycle of said first and second control signals.

* * * * *